(12) United States Patent
Rossi

(10) Patent No.: US 9,195,572 B2
(45) Date of Patent: Nov. 24, 2015

(54) SYSTEMS AND METHODS FOR IDENTIFYING USER INTERFACE (UI) ELEMENTS

(75) Inventor: Claude Rossi, Valbonne (FR)

(73) Assignee: SAP SE, Walldorf (DE)

( * ) Notice: Subject to any disclaimer, the term of this patent is extended or adjusted under 35 U.S.C. 154(b) by 863 days.

(21) Appl. No.: 13/328,735

(22) Filed: Dec. 16, 2011

(65) Prior Publication Data

US 2013/0159890 A1    Jun. 20, 2013

(51) Int. Cl.
| | |
|---|---|
| G06F 3/048 | (2013.01) |
| G06F 11/36 | (2006.01) |
| G06F 9/44 | (2006.01) |
| G06F 17/30 | (2006.01) |

(52) U.S. Cl.
CPC .......... *G06F 11/3684* (2013.01); *G06F 9/4443* (2013.01); *G06F 11/3608* (2013.01); *G06F 17/30861* (2013.01); *G06F 17/30876* (2013.01); *G06F 17/30887* (2013.01)

(58) Field of Classification Search
None
See application file for complete search history.

(56) References Cited

U.S. PATENT DOCUMENTS

| | | | |
|---|---|---|---|
| 6,889,337 B1 | 5/2005 | Yee | |
| 7,412,349 B2 | 8/2008 | Moser et al. | |
| 7,421,683 B2 | 9/2008 | Robertson et al. | |
| 7,840,851 B2 | 11/2010 | Hayutin | |
| 7,930,683 B2 | 4/2011 | Li | |
| 7,962,799 B2 | 6/2011 | Lauer et al. | |
| 8,001,468 B2 | 8/2011 | Khaladkar et al. | |
| 8,056,057 B2 | 11/2011 | Larab et al. | |
| 8,370,715 B2 | 2/2013 | Hafner et al. | |
| 8,612,806 B2 | 12/2013 | Rossi | |
| 2004/0145607 A1 | 7/2004 | Alderson | |
| 2007/0220341 A1 | 9/2007 | Apostoloiu et al. | |
| 2010/0042929 A1 | 2/2010 | Berry et al. | |
| 2010/0325492 A1 | 12/2010 | Isaacs et al. | |
| 2010/0332535 A1 | 12/2010 | Weizman et al. | |
| 2011/0283148 A1 | 11/2011 | Rossi | |
| 2013/0159784 A1 | 6/2013 | Rossi | |

OTHER PUBLICATIONS

Notice of Allowance for U.S. Appl. No. 13/328,799, mailed Sep. 24, 2013, 10 pages.
SAP, "Automate Application Testing—Improve Software Quality and Reduce Testing Costs", 2010, 4 pages.
SAP, "Sara Lee—Increasing Business Continuity After an Upgrade Via SAP Test Acceleration and Optimization", 2010, 4 pages.

*Primary Examiner* — Matt Kim
*Assistant Examiner* — Tuan S Nguyen
(74) *Attorney, Agent, or Firm* — Brake Hughes Bellermann LLP

(57) ABSTRACT

A method includes executing instructions recorded on a non-transitory computer-readable storage media using at least one processor. The method includes identifying a targeted user interface (UI) element using a uniform resource identifier (URI), where the URI includes one or more URI fragments with each of the URI fragments being associated with a specific UI element, parsing the URI identifying a UI element to validate a format syntax of the URI, determining from a current session an initial resolution context, resolving each of the URI fragments within a UI hierarchy in a current resolution context, where the current resolution context is the initial resolution context for a first URI fragment and after resolving a last of the URI fragments, returning a reference to the targeted UI element.

14 Claims, 13 Drawing Sheets

800

```
Public interface IResolver
{
   object SearchObject(UriFragment fragment, IResolutionContext context);
   IResolutionContext GetSubResolutionContext(object currentObject,
IResolutionContext parentContext);
   void Highlight(object foundObject, IResolutionContext currentContext);
}
```

FIG. 8

SYSTEMS AND METHODS FOR IDENTIFYING USER INTERFACE (UI) ELEMENTS

CROSS REFERENCE TO RELATED APPLICATION

This application is related to U.S. patent application Ser. No. 13/328,799, filed on the same date herewith, now U.S. Pat. No. 8,612,806, and titled "Systems and Methods For Recording User Interactions Within A Target Application," which is hereby incorporated by reference in its entirety.

TECHNICAL FIELD

This description relates to systems and techniques for identifying user interface (UI) elements within a target application.

BACKGROUND

Known test automation tools can be used to define test scenarios and to control execution of these test scenarios related to an application targeted for verification (e.g., verification testing). These known test automation tools may support automation of tasks such as application installation, test scenario creation, user interface (UI) interaction, problem detection (such as parsing, pulling agents, etc.), defect logging, comparison of actual outcomes to predicted outcomes, setting up of test pre-conditions, and/or other test control and/or test reporting functions. These known test automation tools can also be configured to record, as a test scenario, user interactions (e.g., native events raised by an operating system (OS) in response to a user interaction) with a user interface (e.g., a graphical user interface) of an application targeted for testing. Hence, the test scenario can be created for the application via the user interface, and the application can be tested via the user interface based on the test scenario.

Existing tools may provide a basic recorder that is capable of recording low-level UI events such as, for example, mouse clicks and keyboard inputs. The test generated with these tools and this approach may be poor in terms of semantics. For example, the tester cannot distinguish easily the click on a button from a click on a link. In addition, the flexibility of hypertext mark-up language (HTML) content generated by a UI framework that is running on a server may present difficulties in collecting information required to be able to play the recorded action again. Thus, it may be desirable to provide systems and techniques to address shortfalls of present technology, and to provide other new and innovative features.

SUMMARY

According to one general aspect, a method includes executing instructions recorded on a non-transitory computer-readable storage media using at least one processor. The method includes identifying a targeted user interface (UI) element using a uniform resource identifier (URI), where the URI includes one or more URI fragments with each of the URI fragments being associated with a specific UI element, parsing the URI identifying a UI element to validate a format syntax of the URI, determining from a current session an initial resolution context, resolving each of the URI fragments within a UI hierarchy in a current resolution context, where the current resolution context is the initial resolution context for a first URI fragment and after resolving a last of the URI fragments, returning a reference to the targeted UI element.

Implementations may include one or more of the following features. For example, the method may further include creating a sub resolution context from the initial resolution context for each UI element embedding child elements, where the current resolution context is the sub resolution context for resolving the URI fragments after the first URI fragment. The method may further include delegating resolution of the URI fragments to one or more resolvers within the sub resolution context, where each of the resolvers is associated with a specific UI technology.

Each of the URI fragments may include a list of attributes. The list of attributes may include attributes covering multiple UI technologies. Each of the attributes may include a name and a value. Resolving each of the URI fragments may include resolving each of the URI fragments using the list of attributes and the current resolution context. The method may further include highlighting the targeted UI element.

In another general aspect, a non-transitory computer-readable storage medium stores instructions that when executed cause a processor to perform a process and the instructions include instructions to identify a targeted user interface (UI) element using a uniform resource identifier (URI), where the URI includes one or more URI fragments with each of the URI fragments being associated with a specific UI element, parse the URI identifying a UI element to validate a format syntax of the URI, determine from a current session an initial resolution context, resolve each of the URI fragments within a UI hierarchy in a current resolution context, where the current resolution context is the initial resolution context for a first URI fragment and after resolving a last of the URI fragments, return a reference to the targeted UI element.

Implementations may include one or more of the following features. For example, the non-transitory computer-readable storage medium may further include instructions to create a sub resolution context from the initial resolution context for each UI element embedding child elements, where the current resolution context is the sub resolution context for resolving the URI fragments after the first URI fragment. The non-transitory computer-readable storage medium may further include instructions to delegate resolution of the URI fragments to one or more resolvers within the sub resolution context, where each of the resolvers is associated with a specific UI technology.

Each of the URI fragments includes a list of attributes. The list of attributes may include attributes covering multiple UI technologies. Each of the attributes may include a name and a value. The instructions to resolve each of the URI fragments may include instructions to resolve each of the URI fragments using the list of attributes and the current resolution context. The non-transitory computer-readable storage medium may further include instructions to highlight the targeted UI element.

In another general aspect, a computer system includes instructions stored on a non-transitory computer-readable storage medium and the computer system include a test player module configured to identify a targeted user interface (UI) element using a uniform resource identifier (URI), where the URI includes one or more URI fragments with each of the URI fragments being associated with a specific UI element. The computer system includes a URI parser configured to parse the URI identifying a UI element to validate a format syntax of the URI and a URI resolver to determine from a current session an initial resolution context, resolve each of the URI fragments within a UI hierarchy in a current resolution context, where the current resolution context is the initial resolution context for a first URI fragment, and after resolving a last of the URI fragments, return a reference to the targeted UI element.

Implementations may include one or more of the following features. For example, the URI resolver may be further configured to create a sub resolution from the initial resolution context for each UI element embedding child elements, where the current resolution context is the sub resolution context for resolving the URI fragments after the first URI fragment. The URI resolver may be configured to delegate resolution of the URI fragments to one or more resolvers within the sub resolution context, wherein each of the resolvers is associated with a specific UI technology.

Each of the URI fragments includes a list of attributes. The list of attributes may include attributes covering multiple UI technologies. Each of the attributes may include a name and a value. The instructions to resolve each of the URI fragments may include instructions to resolve each of the URI fragments using the list of attributes and the current resolution context.

The details of one or more implementations are set forth in the accompanying drawings and the description below. Other features will be apparent from the description and drawings, and from the claims.

BRIEF DESCRIPTION OF THE DRAWINGS

FIG. 8 is an exemplary code snippet that illustrates the IResolver interface.

DETAILED DESCRIPTION

Figure 1:
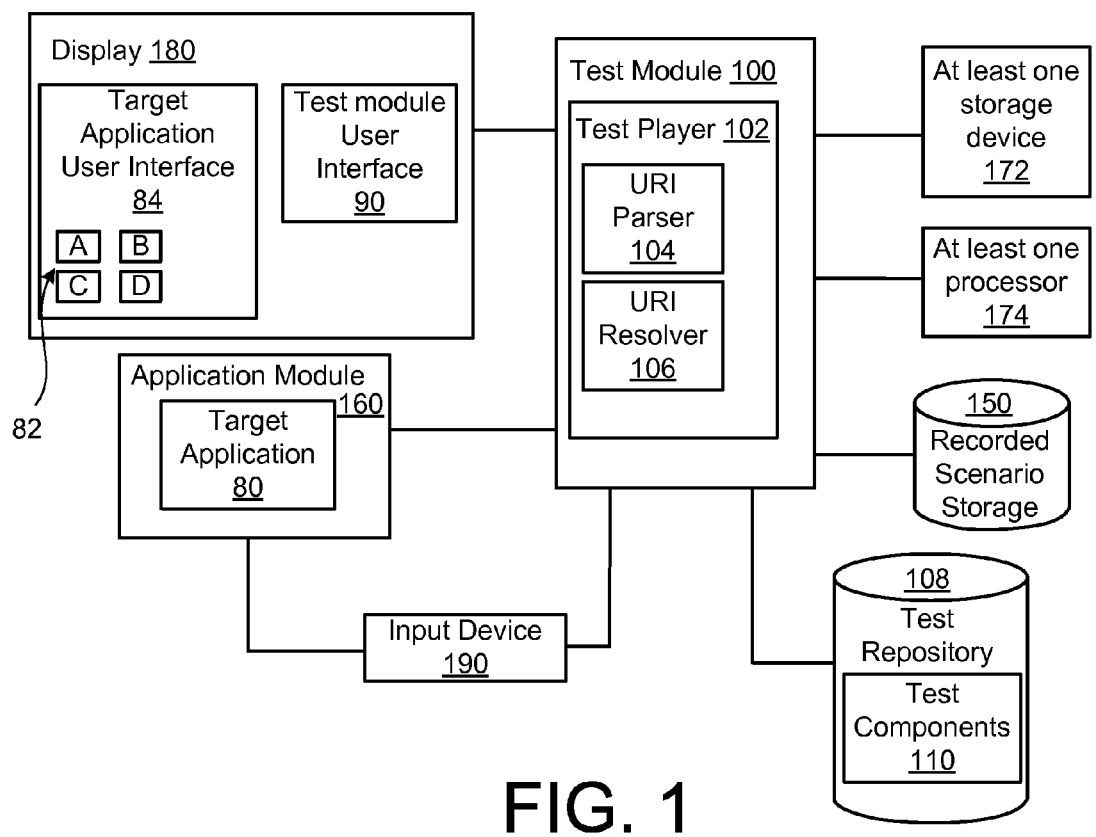
FIG. 1 is an exemplary block diagram that illustrates a test module configured to identify a targeted user interface (UI) element.

FIG. 1 is an exemplary block diagram that illustrates a test module 100 configured to find a targeted element in a user interface (UI) in an application being tested as part of a test scenario. The test module 100 is configured to identify a uniform resource identifier (URI) for the targeted element and to resolve for the URI at runtime (i.e., while the test player 102 is executing a test). As shown in FIG. 1, user interface elements 82 of a target application 80 can collectively define a target application user interface 84 of the target application 80. In some exemplary implementations, the target application 80 may be, for example, a financial application, a business process application, a human resources application, an engineering application, a customer relations management application, a supply chain management application, and/or any other type of application. In some exemplary implementations, the target application 80 may be an enterprise application. In this exemplary implementation, one or more portions of the target application 80 may be executed, or triggered for execution, using an application module 160. Although not shown in FIG. 1, the application module 160 may include one or more processors and/or memory components.

The user interface elements 82 of the target application 80 may be associated with (e.g., configured to trigger, configured to control, etc.) any function of the target application 80. For example, the user interface elements 82 (which define the target application user interface 84) may be configured to managed, can represent, and/or be triggered by one or more functions of the target application 80. The user interface elements 82 of the target application 80 (which includes user interface elements A through D) may be any type of user interface element that can be associated with a user interface (e.g., graphical user interface (GUI)). For example, the user interface elements 82 may be, or may include, visual indicators, images, text-based objects, menus, links (e.g., hyperlinks), buttons, fields, command-line interfaces, check boxes, and other types of user interface elements.

Interactions with the user interface elements 82 of the target application 80 may be performed using an input device 190 (via the application module 160), which may be, for example, a keyboard device, a mouse device, an electro static touchpad device, and/or other types of input devices. User interactions (also may be referred to as events) may include, for example, inserting text into one or more user interface elements 82, selecting one or more of the user interface elements 82, moving one or more of user interface elements 82, accessing functionality associated with one or more of the user interface elements 82, and/or other types of interactions.

As one exemplary interaction, user interface element C may be a field into which alpha-numeric characters may be entered by a user of the target application 80 via the device 190. In some exemplary implementations, one or more of the user interface elements 82 may be referred to as a user interface control, or as a user interface object. As shown in FIG. 1, the user interface elements 82 that define the target application user interface 84 may be displayed (e.g., rendered) within a display 180.

Also, as shown in FIG. 1, a test module user interface 90 is displayed (e.g., rendered) within the display 180. The test module user interface 90 may be associated with (e.g., may be configured to manage, may represent, may be triggered by) one or more functions of the test module 100. Although not shown in FIG. 1, the test module user interface 90, similar to the target application user interface 84, may include one or more user interface elements.

In one exemplary implementation, the target application 80 may be implemented using a browser application. For instance, the target application 80 may implemented within the framework of a browser application such that the target application 80 is accessible through the Internet. In other exemplary implementations, the target application 80 may be a standalone application that is accessible over a network including, for example, the Internet.

The target application 80 may be implemented using one or more different frameworks. For example, the target application may be implemented using one or more different UI frameworks, where each of the different UI frameworks may generate HTML content using different Web technologies.

The test module 100 may be implemented as a standalone module or, in one exemplary implementation, may be implemented as part of an application or a group of application modules. For example, the test module 100 and its related functionality may be implemented as part of SAP Solution Manager. In this example, an example target application 80 may include the SAP CRM Solution application and the test module 100 may be used to automate the testing of the SAP CRM Solution application, which may be built on top of a WebCUIF Framework. In other examples, the target application 80 may include other SAP applications, including ones built on top of the Web Dynpro Framework and the test module 100 may be used to automate the testing of these other applications. Additionally, other illustrated components, including the recorded scenario storage 150 and the test repository 108, may be implemented as part of the SAP Solution Manager.

The test module 100 may include a test player 102, which includes a URI parser 104 and a URI resolver 106. The test player 102 may be configured to playback one or more different test scenarios using test components 110 stored in the test repository 108 against a target application user interface 84 that is part of the target application 80. The test scenario typically targets one or more UI elements and the test player 102 along with the URI parser 104 and the URI resolver 106 are configured to identify the targeted UI elements.

As part of the generation of specific test scenarios against targeted UI element, the test module 100 also may include a test recorder (not shown) that is configured to record (e.g., collect) user interactions with the user interface elements 82 of the target application 80. One or more recorded scenarios of the target application 80 may be defined and stored in the recorded scenario storage 150 based on recording a sequence of user interactions (triggered using the input device 190) with the user interface elements 82 of the target application 80 to perform a particular function (e.g., a business task, trigger a calculation, etc.) of the target application 80. After the recorded scenario 10 has been captured, the recorded scenario may be converted to a test scenario having test components 110 that are stored in the test repository 108 at a later time to test (e.g., verify) the particular function of the target application 80 as triggered by the sequence of user interactions recorded in the recorded scenario 10 using the test player 102. The test player 102 may be used to execute the generated test to check and validate existing applications and new applications including, for example, new versions of the target application 80.

The test module 100, using a test recorder (not shown) may be configured to enable testers (users who are validating the target application 80) to record different interaction scenarios with the target application 80 for storage in the recorded scenario storage 150. The test recorder (not shown) may be configured to collect enough information to make it possible to identify a targeted UI element within a target application 80. The target application 80 may include a UI hierarchy (different levels of the UI) where user interface elements may be displayed and included in various levels of the UI hierarchy. The collection of such information may be complex and depend on a particular technology used to generate the user interface and the UI hierarchy. The test recorder (not shown) may be configured to record the user interactions with the user interface elements 82 and at the same time understand the semantics of the particular user interface elements such that the recorded scenarios include comprehensive information to allow the generation of test scenarios using the recorded events.

The test player 102 is configured to play the test scenarios and to identify a targeted UI element 82 from among multiple UI elements 82 within a UI hierarchy. The test player 102 is configured to determine a context from a current session within the UI hierarchy. The URI parser 104, discussed in more detail below, is configured to parse a URI identifying a UI element. The URI provides the information needed to find the target UI element among the UI element hierarchy.

As discussed above, the test module 100 may include a test recorder (not shown). The test recorder or other tools (e.g., Object Spy) may be used at design time to compute a URI for a UI element such as one of the user interface elements 82 in the target application user interface 84. For example, an Object Spy tool may enable a tester to select one of the user interface elements 82 using an input device 190 and to generate the URI. The tester may then note and use the URI when designing the tests. In another example, the test recorder itself provides an appropriate value to the URI parameter of each test component during the process of recording a business scenario and generating test components (e.g., test components 110) for the test scenario.

Each URI includes one or more fragments. Each of the URI fragments may be associated with a specific target element. The URI resolver 106, discussed in more detail below, may be configured to resolve each of the URI fragments within the UI hierarchy and, after resolving the fragments, return the reference to an object representing the target UI element.

The test module 100 may be operably connected to at least one storage device 172 and at least one processor 174. While illustrated as connected to the test module 100, the storage device 172 and the processor 174 may be connected to or operably coupled to, either physically or logically, all of the components illustrated in FIG. 1. The storage device 172 may be any type of storage device or memory module or multiple memory modules that are used to store instructions for processing by the processor 174. The storage device 172 may include RAM, ROM, or any other type of storage device. The storage device 172 may be a non-transitory computer-readable storage medium. The processor 174 may be configured to execute the instructions on the storage device 172 and cause the other components illustrated in FIG. 1 to perform one or more various actions as described throughout this document.

Figure 2:
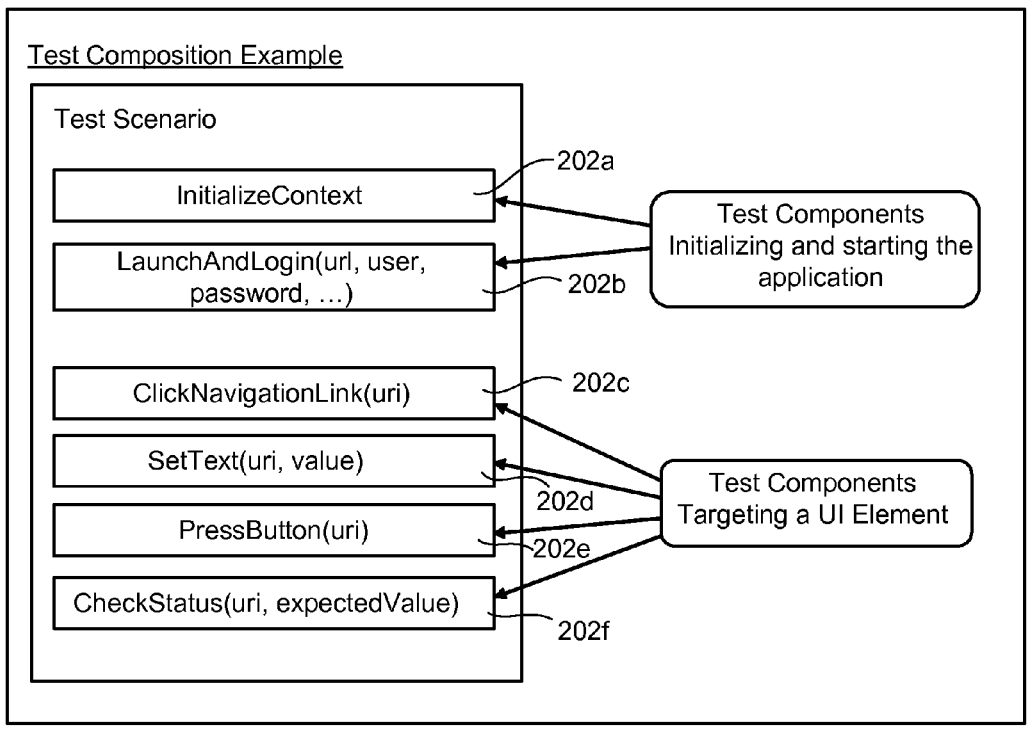
FIG. 2 is an exemplary block diagram that illustrates a test composition example.

Referring also to FIG. 2, an exemplary block diagram illustrates a test composition example 200 using test components 202a through 202f. The test composition example 200 may be an aggregation of test components. The test components 202a-202f may be examples of test components 110 stored in the test repository 108 of FIG. 1. An approach to the automated testing of target applications is to use test components for producing the actions normally made by users. Test components may be used to perform operations on a target application UI 84 such as a mouse click, pressing a key on a keyboard or setting a value of an input field. Such operations or actions may be performed against an element of the UI of the target application.

The test components may target a UI element, where the UI element has a URI. The URI provides the information needed to find the target among the UI element hierarchy. In the test composition example 200, the test components 202a and 202b may be responsible for performing the operations of initializing 202a and starting 202b a target application. The test components 202a and 202b may not be configured to target UI elements, but instead perform other operations related to initializing and starting the target application that is being tested.

The test components 202c, 202d, 202e and 202f may have a parameter that identifies specific targeted UI elements. For example, the test components 202c-202f may be used to simulate user interactions or check the behavior of the target application. For instance, test component 202c may be used to target a link and check the navigation of the link, where the test component 202c has a parameter providing the URI identifying a particular link. The test component 202d may be used to set text in a field, where the test component 202d has two parameters, one parameter providing the URI identifying a particular field and one parameter providing the value to enter in that field. The test component 202e may be used to press a button, where the test component 202e has a parameter providing the URI identifying a particular button. The test component 202f may be used to check the status of a target UI element, where the test component 202f has a parameter providing the URI identifying a UI element and a parameter providing the expected value.

Figure 3:
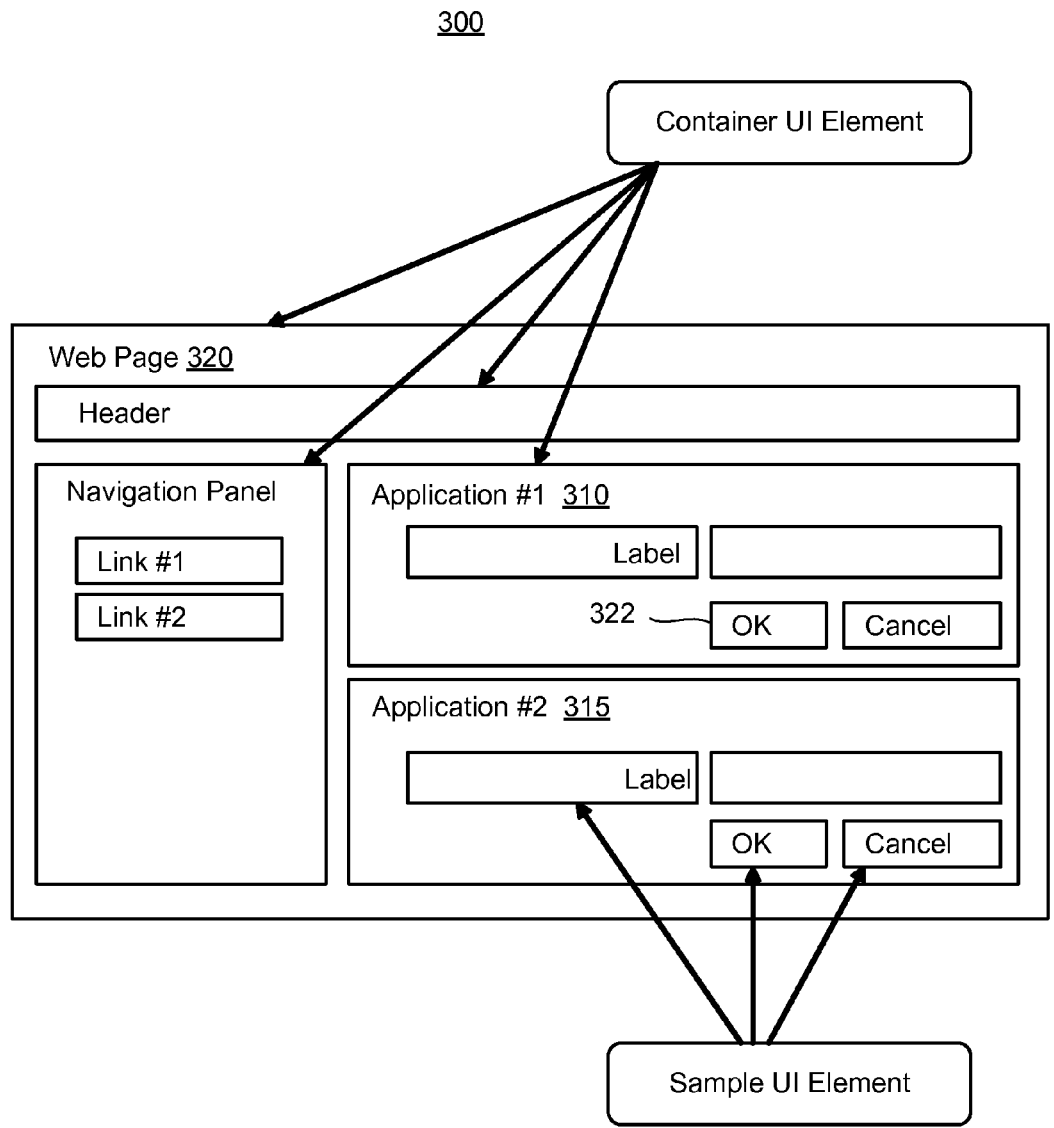
FIG. 3 is an exemplary screenshot of a user interface with user interface elements of a target application.

Referring to FIG. 3, an exemplary screenshot 300 illustrates a user interface with user interface elements of multiple target applications. For example, the screenshot 300 may represent a target application user interface 84 of FIG. 1 and the elements in the screenshot 300 may correspond to user interface elements 82 on the target application user interface 84. The identification of a specific UI element may be complex. In the example of FIG. 3, two applications 310 and 315 are embedded in a single web page 320. In this example, it may be difficult for a tester to check the behavior of the UI element "OK" button 322 in Application #1 310 because of having two applications embedded in the web page 320. Since the "OK" button appears twice in the browser window, searching for the button using its text is not possible and may lead to unpredictable results. While the "OK" button 322 may have a unique identifier within the application context, nothing guarantees that Application #1 310 and Application #2 315 are different applications. In one implementation, the same application may be embedded twice in the web page 320 with different settings.

Furthermore, a tester may not know the details about the underlying web page 320 structure. For instance, the content of each application may be inserted inline in the web page 320 (i.e., using page aggregation) or embedded using hypertext markup language (HTML) containers such as <IFRAME> or <FRAME> elements (i.e., using page composition). In this example, targeting the "OK" button 322 may be dependent on the technique used to render the web page 320 content. The tester may not know the actual UI technologies being used. Embedded applications, such as applications 310 and 315, may rely on web browser plug-ins to display rich content based on Adobe Flash, Java Applets or Silverlight. The test module 100, including the test player 102, the URI parser 104 and the URI resolver 106 of FIG. 1 may be used to parse and resolve a URI to return a reference to an object representing the target element, which in this example is the "OK" button 322.

Referring back to FIG. 1, in one exemplary implementation, a URI may include a syntax and the syntax may be used to assist in identifying UI elements. The URI parser 104 may be configured to parse the URI in accordance with the syntax. The syntax described is just one exemplary implementation of a URI syntax and any other syntax may be used if the URI parser 104 is configured for the syntax.

A valid URI may include a list of one or more URI fragments. In one notation scheme, the URI fragments may be separated by the ">" character. Each URI fragment identifies a specific UI element, where each element may be the parent container of the subsequent one.

For example, a URI with three fragments may be expressed as:

f1>f2>f3

In this example, f1 refers to the main UI element. The main UI element, f1, contains the element, f2, which is another container that contains the f3 element. In one example, the f3 element may be the UI element that the test component wishes to interact with.

Each URI fragment may include a list of one or more attributes. Each attribute may be specified as a Name/Value pair of the form name=value. In one exemplary notation scheme, each Name/Value pair may be separated by a semicolon ";" character.

In one example, a URI fragment includes two attributes: id=elementId; tag=INPUT.

Each underlying UI technology may have other specifications for identifying elements and may rely on custom attributes to address specific use cases.

Figure 4:
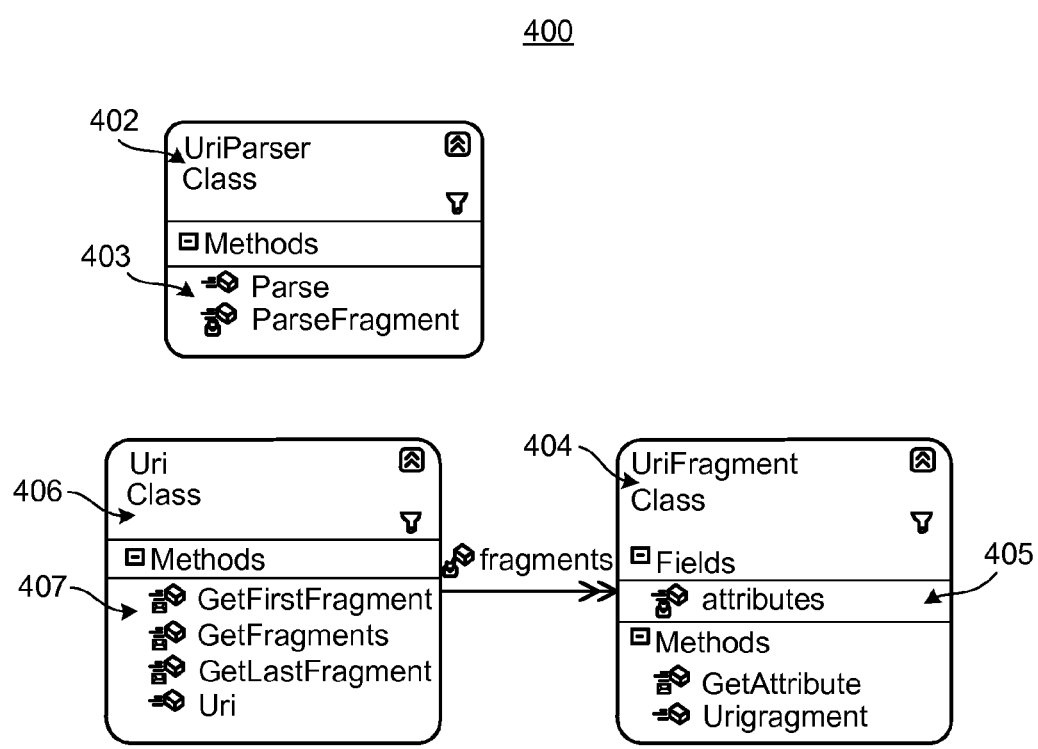
FIG. 4 is an exemplary class diagram that illustrates the parser class diagram.

Referring to FIG. 4, an exemplary class diagram 400 illustrates a class diagram related to a URI parser such as, for example, the URI parser 104 of FIG. 1. The class diagram may illustrate functionality of the URI parser 104. The UriParser class 402 may be the entry point. The Parse method 403 may split the URI into fragments. Each fragment is then parsed to determine the list of attributes. As a parsing result, the caller may get an Uri object that contains its list of UriFragment objects 404. Each fragment may hold its own list of attributes 405. The Uri class 406 may expose one or more other methods 407 (e.g., GetFirstFragment, GetFragments, GetLastFragment) that may be used at runtime while resolving the URI and searching for the targeted elements.

Figure 5:
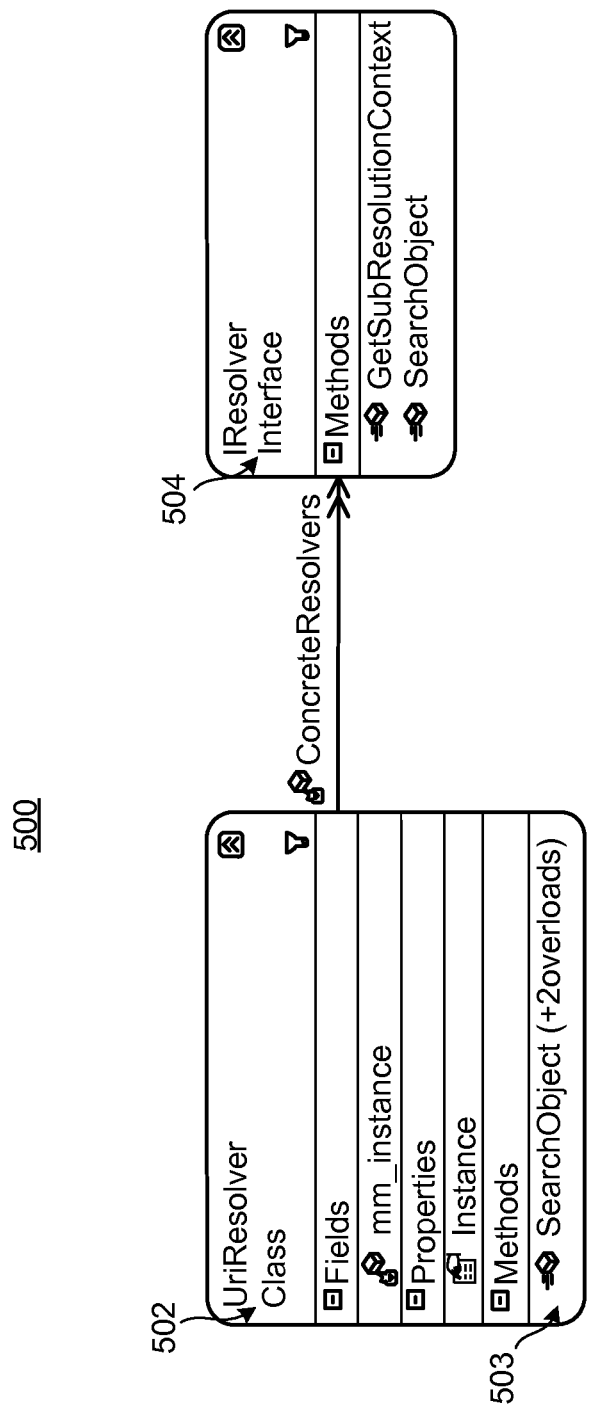
FIG. 5 is an exemplary class diagram that illustrates the resolver class diagram.

Referring to FIG. 5, an exemplary class diagram 500 illustrates a class diagram related to a URI resolver such as, for example, the URI resolver 106 of FIG. 1. All of the test components that are targeting a UI element need to provide a URI and resolve it at runtime to find the actual target UI element. Once the URI has been parsed, including checking the syntax, the URI is resolved. The UriResolver class 502 is a singleton exposing the SearchObject methods 503.

In one exemplary implementation, the UriResolver class 502 may not find the target UI element on its own and may delegate to objects implementing the IResolver interface 504 using one or more concrete resolvers. Each concrete resolver implementing the IResolver interface 504 may be dedicated to a specific UI technology. There may be a concrete resolver object for each technology supported by the test module 100. The concrete resolvers may be used to find the targeted UI element based on the attributes the URI fragment provides. The concrete resolvers may be part of the URI resolver 106 of FIG. 1.

Figure 6:
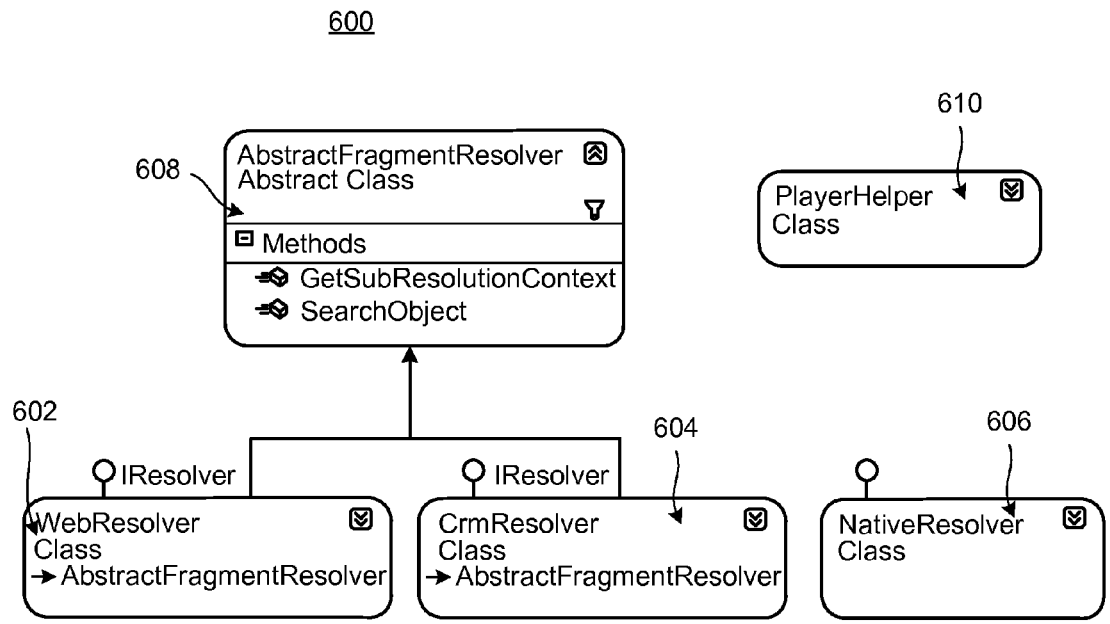
FIG. 6 is an exemplary class diagram that illustrates the concrete resolvers class diagram.

Referring to FIG. 6, an exemplary class diagram 600 illustrates a class diagram related to multiple different concrete resolvers. The WebResolver class 602 may be used and called to resolve targeted UI elements in regular HTML documents and web pages. The CrmResolver class 604 may be used and called to resolve targeted UI elements in the SAP CRM Application, which has been developed on top of a framework called WebCUIF that is an extension of web technologies with some custom UI elements.

The NativeResolver class 606 may be used and called to resolve targeted UI elements that have been created using the native API of the operating system. For example, the NativeResolver class 606 may identify native windows elements such as, for example, buttons that are part of a browser toolbar.

The implementation of the SearchObject method of each resolver 602, 604 and 606 encapsulates the logic which may be specific to the underlying UI technology. Resolvers that are responsible for UI technologies that are built on top of HTML pages and regular web content may extend from the AbstractFragmentResolver class 608 to benefit from a default implementation. Those resolvers also may benefit from the methods exposed by the PlayerHelper class. Resolvers also may rely on third party APIs. For example, searching for an HTML element in the HTML DOM Hierarchy may use interfaces exposed by the MSHTML COM Interface.

Figure 7:
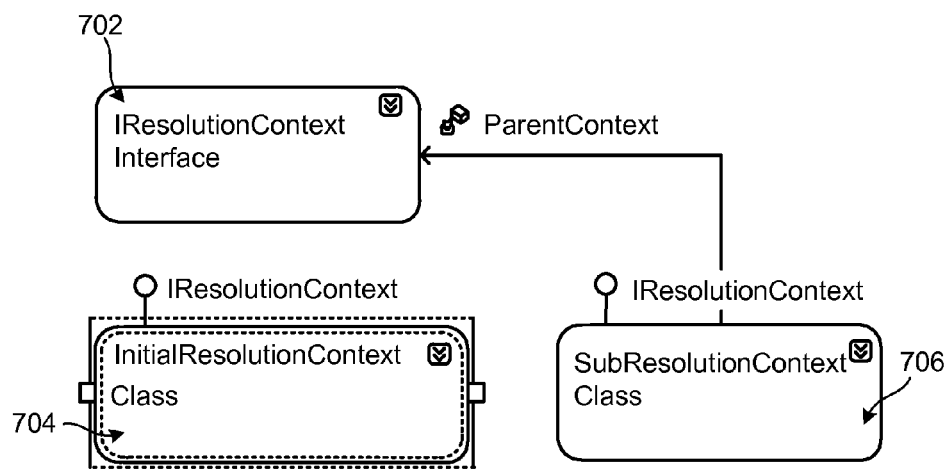
FIG. 7 is an exemplary class diagram that illustrates the resolution context class diagram.

Referring to FIG. 7, an exemplary class diagram 700 illustrates a class diagram related to a resolution context. The resolution of a URI Fragment may need information about the runtime context such as, for example, the current browser session, the current window, and the current HTML document. This information may be provided via a resolution context. For instance, the operation of searching for an "OK" button in the main window must be done with a different context than the one searching for an "OK" button in a popup window.

As shown in the class diagram 700, the contexts may implement the IResolutionContext interface 702. The purpose of this interface is to provide access to any kind of information that might be required at runtime to find the UI element.

The URI resolver 106 may start the URI resolution with an Initial Resolution Context 704 representing the main container. This initial context is step by step replaced by Sub Resolution Contexts 706 when an intermediate UI container is found in the UI hierarchy. The IResolutionContext interface 702 may provide two methods. A "setter" method may be used to put information into the context. The setter method may receive a key and a value as input parameter.

A "getter" method may be used to read the information from the context by providing the key. For example, the Initial Resolution Context may contain a reference to the BrowserController and a reference to an object representing the main HTML document. A Sub Context may be created when the main HTML document uses a FRAME element to include a second HTML document. The purpose of that sub context is then to provide access to the second HTML document.

Sub Resolution Contexts 706 may include a reference to their parent context. Using the reference to the parent context, each Sub Context can recursively provide access to information coming from the whole context hierarchy without duplicating that information.

Referring to FIG. 8, an exemplary code snippet 800 illustrates the IResolver interface. The IResolver interface may define three methods. The IResolver.SearchObject method may be used to search and return a reference to a UI element. One input parameter may include the UriFragment fragment, which specifies the URI fragment identifying the UI Element that the caller is looking for. Another input parameter may include IResolutionContext context, which specifies the current runtime context to identify where to search for the UI element.

The IResolver.SearchObject method may return a reference to the UI element or may return a null. For instance, the method may return a reference to a UI element when the element is found in the context specified. If no UI element is found in the context specified, the method may return <null>.

The method also may return <null> when the URI fragment specified does not match the UI technology of the current resolver. In other words the resolver returns <null> to inform the caller (i.e.: the UriResolver) that it should delegate to another resolver to find the targeted UI element.

Another method referred to in the code snippet 800 is the IResolver.GetSubResolutionContext method. The IResolver.GetSubResolutionContext method may be used to create a Sub Resolution Context matching the current UI element. This may occur when the URI resolution must continue and search for child UI elements. In other words, this method may get invoked for each URI fragment except the last one. The resolver may be used to populate the context with the information required by subsequent URI fragment resolution. The information stored into the sub context may include data that is specific to the underlying UI technology.

The IResolver.GetSubResolutionContext method may include one or more input parameters. For example, the method may include an Object currentObject that specifies the container UI element that has been found by the searchObject method. The method also may include an IResolutionContext parentContext that specifies the parent context. The IResolver.GetSubResolutionContext method may return a reference to a Sub Resolution Context.

Another method referred to in code snippet 800 is the IResolver.Highlight method. The IResolver.Highlight method may be used to surround the element with a visual effect at runtime. This may be used for troubleshooting test cases when they fail. The testers may use this visual effect to see immediately which elements are being used while playing a test. Of course the visual effect may differ depending on the element nature and the underlying UI technology.

The IResolver.Highlight method may include one or more input parameters. For example, one input parameter may include an Object foundElement, which is a reference to the UI element that the resolver should highlight. Another input parameter may include an IResolutionContext currentContext, which identifies the context where the element has been found.

Figure 9:
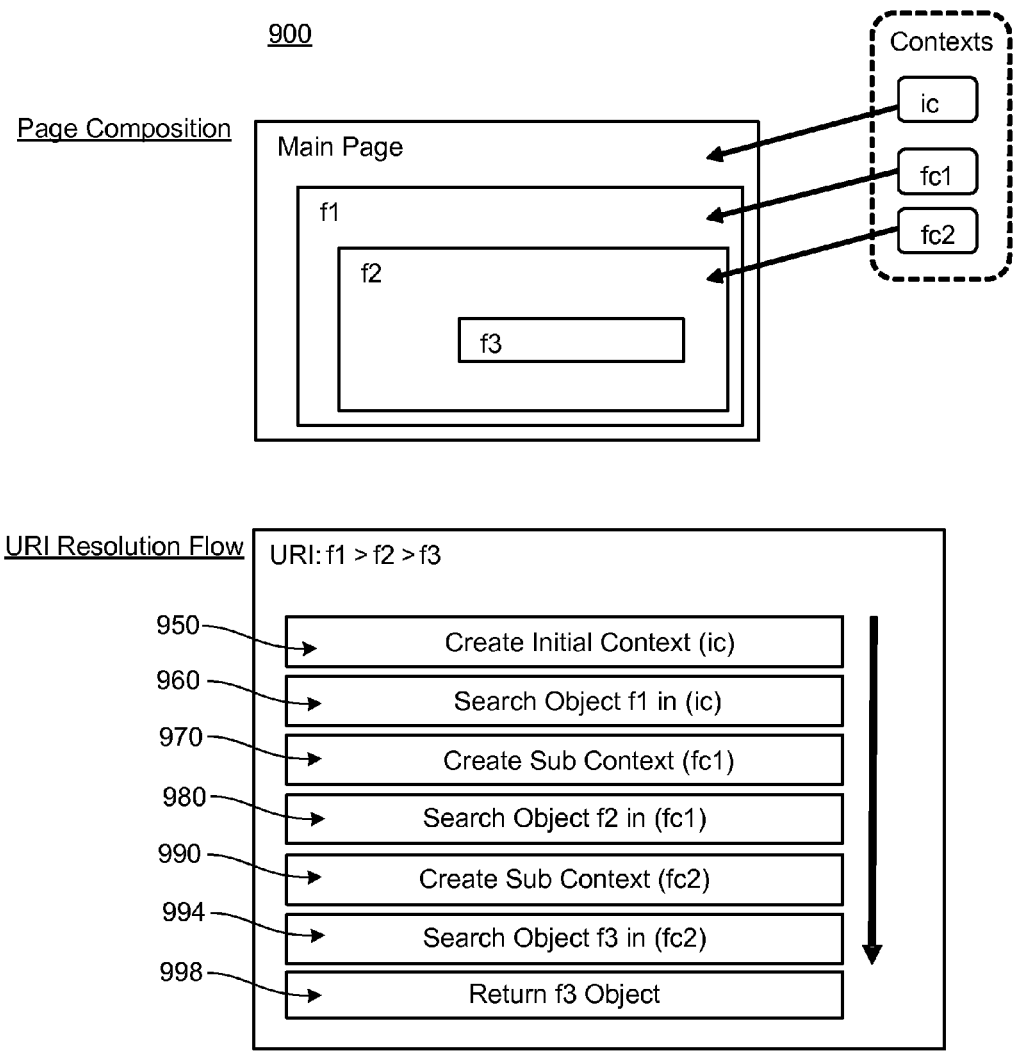
FIG. 9 is an exemplary sketch and process flow for a URI resolution example.

Referring to FIG. 9, an exemplary sketch and process flow 900 illustrates a URI resolution example. In this example, the goal may be for a test component to resolve the URI and perform an automated test action on a target UI element. This example refers back to the example discussed above with respect to URI fragments f1>f2>f3. The URI resolver 106 of FIG. 1 may first resolve for the f1 fragment within the initial context (ic) by creating the initial context (950). The URI resolver may search for object f1 in the initial context (960). Then, a sub context is created for the f1 container (fc1) (970). The URI resolver may search for object f2 is the fc1 context (980). If the f2 element is found, a sub context is created for the f2 container (fc2) (990). The URI resolver may search for object f3 in the fc2 context (994). The f3 fragment being the last one, the found element is returned to the caller (998).

Figure 10:
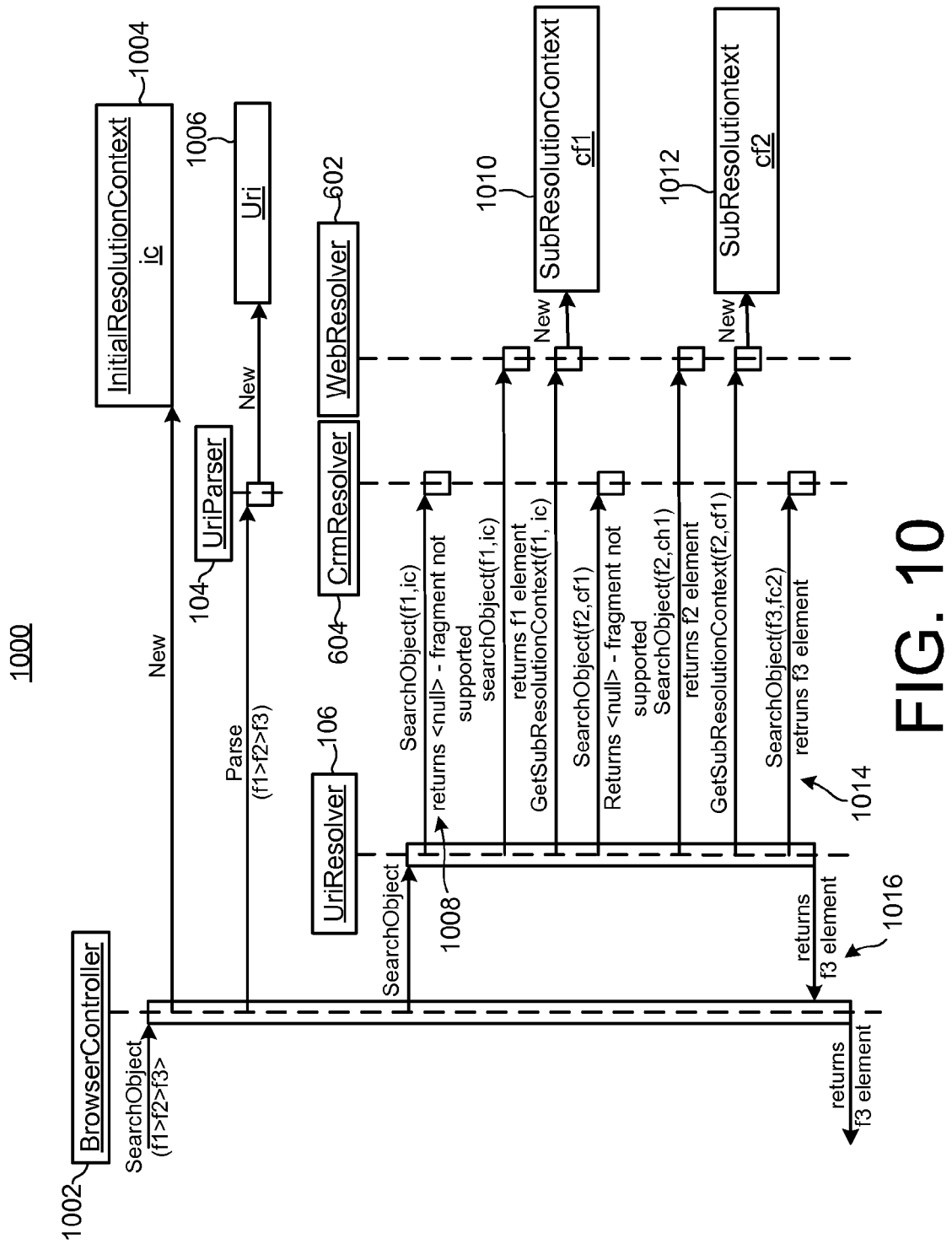
FIG. 10 is an exemplary sequence diagram for resolving for a URI using concrete resolvers.

Referring to FIG. 10, an exemplary sequence diagram 1000 illustrates an exemplary sequence of events for resolving for the URI fragment f3 from the example of FIG. 9, including using concrete resolvers during the resolution process. This sequence diagram 1000 starts with a call to the BrowserController 1002, which may be part of the Test Player 102 of FIG. 1, to search for the f3 UI element. The BrowserController 1002 creates a new InitialResolutionContext ic 1004 representing the current web page displayed in the browser window. The web page displayed in the browser window may be representative of the target application user interface 84 in the target application 80.

The BrowserController 1002 then calls the UriParser (e.g., URI parser 104 of FIG. 1 implementing the UriParser class 402 of FIG. 4) to get the uri object 1006, which is the instance of the Uri class. The UriResolver (e.g., URI resolver 106 of FIG. 1 implementing the UriResolver class 502 of FIG. 5) is then invoked. The UriResolver 106 receives the newly created uri object 1006 and the ic context 1004 as input parameters.

For each UriFragment instance, the UriResolver 106 invokes the concrete resolver objects available. As discussed above, each of the concrete resolvers is associated with a particular UI technology. Multiple different UI technologies may be used to render the single web page in the browser window. In this example, two concrete resolvers are illustrated: the CrmResolver (e.g., CrmResolver 604 of FIG. 6) and WebResolver (e.g., WebResolver 602 of FIG. 6). While not illustrated in this example, other and/or additional concrete resolvers may be used.

Each resolver tries to resolve the UriFragment. A resolver may not be able to resolve a particular URI fragment and return <null> to inform the caller that the fragment does not match the UI technology it is responsible for. In this example, the CrmResolver 604 attempts to resolve for the f1 element in the initial context, but the UI technology associated with the f1 element is not supported by the CrmResolver 604, so it returns a <null> result 1008. The WebResolver 602 does support the UI technology for f1, so it returns the f1 element.

For each intermediate UriFragment instance (i.e.: f1 and f2), the UriResolver 106 invokes the GetSubResolutionContext method. The corresponding resolver must create the appropriate SubResolutionContext and populate it with the information required to continue the URI Resolution. In this example, the WebResolver 602 uses the GetSubResolutionContext method to create the contexts cf1 1010 and cf2 1012, respectively, for the f1 and f2 elements.

Finally, the last fragment is resolved by searching for the f3 element in the fc2 context 1014. The f3 fragment being the last one, the element found is returned to the caller 1016.

Figure 11:
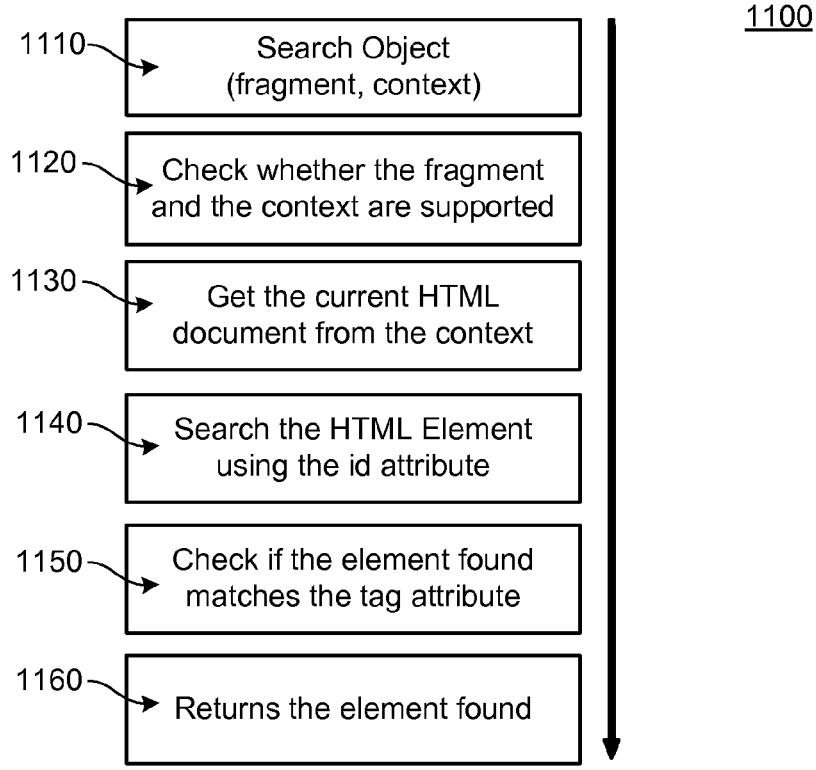
FIG. 11 is an exemplary flow diagram that illustrates an example SearchObject method.

Referring to FIG. 11, an exemplary flow diagram 1100 illustrates an example SearchObject method. Flow diagram 1100 illustrates a typical flow for the SearchObject method, as implemented by the WebResolver.

The SearchObject method gets a URI fragment and a resolution context as input parameters (1110). The method checks whether the current fragment matches the web technology (1120). In one exemplary implementation, the method checks whether the fragment provides an id and a tag attribute. If the fragment is not something the WebResolver can handle, the method stops by returning <null> to the caller.

If the fragment is compliant, the method gets from the current context a reference to the current HTML Document (1130). The method then searches for the HTML element using the id attribute (1140). During this step, the PlayerHelper class may be used as well as third party COM interfaces.

If the element is not found, the method raises an exception. If an HTML element is found, the method may check using other attributes if the element type matches the expected ones (1150). In one exemplary implementation, the method may verify whether the HTML tag matches the tag attribute specified or not. If the check fails the method raises an exception. The method finally returns the element found (1160).

Other scenarios are of course possible. The SearchObject method may for instance have the ability to search for HTML element using a combination of several attributes such as a name, a text, a style or any other information available in the HTML Document.

Figure 12:
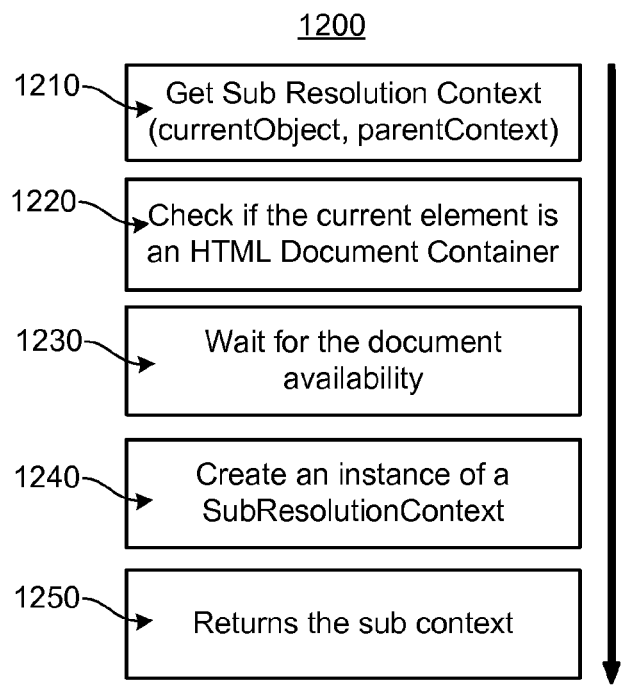
FIG. 12 is an exemplary flow diagram that illustrates an example GetSubResolutionContext method.

Referring to FIG. 12, an exemplary flow diagram 1200 illustrates an example GetSubResolutionContext method. In one exemplary implementation, assume that the two first fragments of our example are referring to IFRAME or FRAME elements. The GetSubResolutionContext method gets invoked for both of them. The flow diagram 1200 illustrates how the WebResolver creates the appropriate sub context to let the URI resolution drill down the hierarchy of embedded HTML documents.

The GetSubResolutionContext method receives an object and a context as input parameter (1210). The object is the element that has been found by the previous SearchObject. The first step is to make sure the object is an HTML object and more precisely if the HTML element is a container that can include another HTML Document (i.e.: a FRAME or an IFRAME) (1220). If this is not the case, it raises an exception.

If it's a container, the method may wait until the HTML document is complete (1230). For instance, the frames may be waiting for an HTTP response. This step may fail after some period of time and raise a time out exception.

When the document is complete, the method creates an instance of the SubResolutionContext class and populates it with the required information such as, for example, the parent context, the frame element and its HTML document (1240). Finally, the method returns the newly created sub context to the caller (1250).

Figure 13:
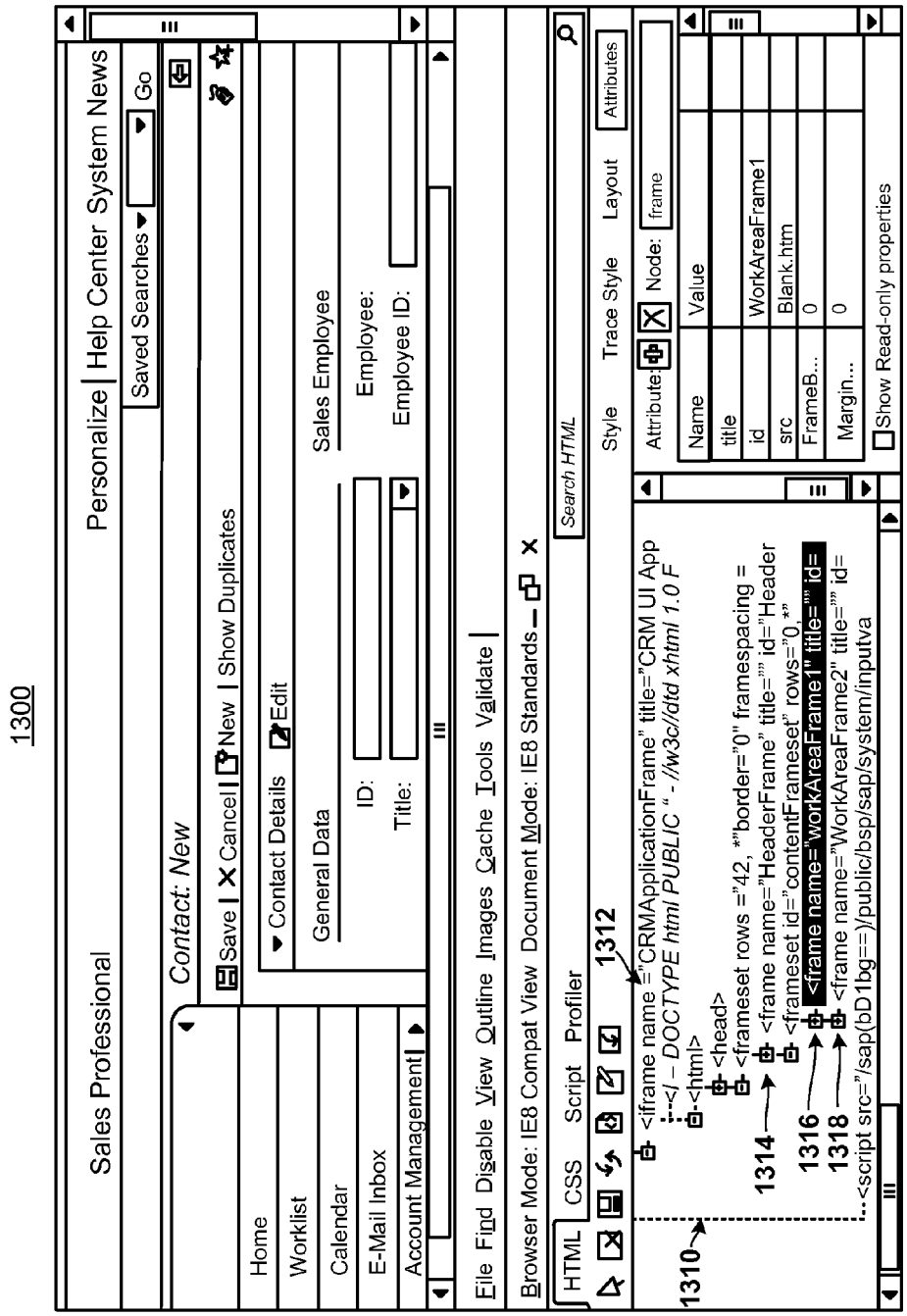
FIG. 13 is an exemplary screen shot of a CRM application web page.

Referring to FIG. 13, an exemplary screen shot 1300 illustrates an example of page composition in a CRM application using FRAME/IFRAME HTML elements. The developer tool area exposes the internal HTML structure 1310. As can be seen from this information, the UI relies on page composition. The CRM UI framework, which may be running as a server-side application, generates web pages that use both <IFRAME> and <FRAME> elements to organize the layout of the content. In this example, a CRMApplicationFrame element 1312 contains a HeaderFrame 1314, a WorkAreaFrame1 element 1316 and a WorkAreaFrame2 element 1318. Each of these frames may display its own HTML document. This means that each frame may have its own life-cycle, with each frame being capable of sending HTTP requests to the web server and waiting for the corresponding HTTP response. This example highlights the technical complexity of the HTML content and shows that this complexity may be specific to the web UI technology being used.

Figure 14:
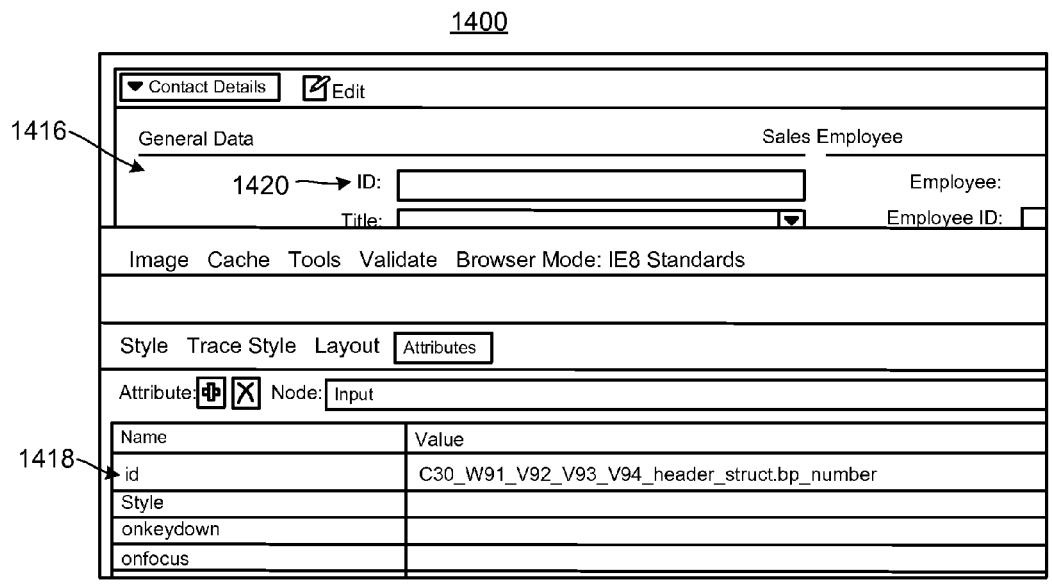
FIG. 14 is an exemplary screen shot of some of the content of the web page shown in FIG. 13.

Referring to FIG. 14, an exemplary screen shot 1400 illustrates the content of one of the two work areas from the web page screen shot 1300 of FIG. 13. In this example, the WorkAreaFrame1 1416 contains some input fields, including an ID field 1420.

In the developer tool section, the ID field 1420 is an <INPUT> HTML element and this HTML element has an id attribute 1418, which is set at:
C30_W91_V92_V93_V94_header.struct.bp_number The URI targeting the ID field 1420 needs to be resolved by going through all of the parent frame containers. Thus, there are three URI fragments: one for the CRMApplicationFrame, one for the WorkAreaFrame1 and one for the input field itself:

id=CRMApplicationFrame; tag=IFRAME
id=WorkAreaFrame1; tag=FRAME
id= C30_W91_V92_V93_V94_header.struct.bp_number; tag=INPUT At runtime, the URI resolver (e.g., URI resolver 106 of FIG. 1) may delegate to the concrete resolvers to search for the UI elements. In this example, all fragments are referring to regular HTML elements and each fragment only provides two attributes: the id of the HTML element and the tag name of the HTML element. All fragments can therefore be resolved by a single resolver, which is the one responsible for regular HTML pages. In this case, the WebResolver (e.g., WebResolver 602 of FIG. 6) may be used to find each HTML element, including the frames. The two first fragments are referring to IFRAME and FRAME elements. Both are HTML Document containers. The URI resolution calls for those two fragments the GetSubResolutionContext method (e.g., as described in flow 1200 of FIG. 12) to create the appropriate sub contexts. The sub contexts that are created here may be "wrappers" built on top of the frame element. The wrappers provide access to the HTML document that the frame includes.

A typical use-case for such input field 1420 is to set its value. The test module 100 of FIG. 1 may use a test component called to test the operability of the input field: InputField_SetValue and expecting two parameters: the URI of the input field and the new value of the input field.

Figure 15:
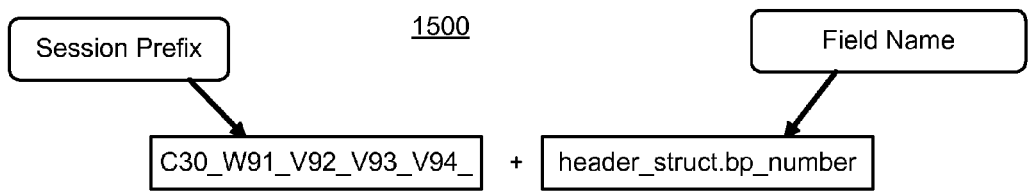
FIG. 15 is an exemplary block diagram of a session prefix example.

Referring to FIG. 15, an exemplary block diagram 1500 illustrates a session prefix example. In one exemplary implementation, the UI Framework (e.g., running server-side) have to deal with information that has a restricted life-cycle. As shown in FIG. 15, the CRM Application is a typical example where the content displayed is bound to a browser session and a user session. Both sessions may expire to release web server resources after some time.

The impact on the HTML content is important because the generated id may change each time the user restarts the application. With CRM, all elements are prefixed with a data identifying the current session. From a automated testing perspective this Session Prefix has an impact because the id attribute cannot be used to identify the input field.

In this example, the CrmResolver concrete resolver may be used for this specific situation. CRM Applications are built on top of a specific CRM UI framework (a.k.a. as WebCUIF). The WebCUIF framework generates very complex HTML documents that the standard WebResolver cannot support. The generated HTML documents contain hidden SPAN elements that are providing meta-information coming from the data model available server-side.

The <INPUT> element has a parent <SPAN> element providing additional information:

```
<span class="tao-testmode"
id="header_struct.bp_number"dynamicId="c30_w91_V92_V93_V94_header.bp_number
">.
```

The <SPAN> element is not visible to the user at runtime. The class attribute (class="tao-testmode") is used to detect this specific SPAN element. The <SPAN> element shown in this example provides additional attributes that are relevant to automated testing of target applications. For example, the SPAN element includes an id attribute, which is not prefixed by information bound to the session. The id attribute may be used to identify the control. The SPAN element also may include a dynamicId attribute, which refers to the id attribute of the child element. The test player 100 may use it at runtime to search for the child element in the HTML DOM hierarchy.

The URI to target the CRM Input field will now have a "crm.id" attribute. For instance:

```
id=CRMApplicationFrame; tag=IFRAME >
id=WorkAreaFrame1; tag=FRAME >
crm.Id=header_struct.bp_number
``` instead of:

```
id=CRMApplicationFrame; tag=IFRAME >
id=WorkAreaFrame1; tag=FRAME >
id=C30_W91_V92_V93_V94_header_struct.bp_number; tag=INPUT
```

This new crm.id attribute is something the WebResolver is not aware of. As a consequence, the WebResolver will not be able to resolve such URI fragment. As already described, the UriResolver iterates threw the list of all available resolvers until it finds the appropriate one. With this example, the CrmResolver will detect the specific crm.id attribute and react accordingly. The implementation of the SearchObject method first searches for the SPAN element and then searches for its child element.

In another exemplary use case, the CRM UI Framework internally may rely on the so-called "Frame-Swapping" concept to avoid some flickering of the web content while receiving HTTP responses from the web server. Both the WorkAreaFrame1 and the WorkAreaFrame2 can be used to display the CRM content.

```
name="WorkAreaFrame1" title="" id="WorkAreaFrame1"
name="WorkAreaFrame2" title="" id="Work AreaFrame2"
```

The CRM framework switches from one frame to the other each time a new content is shown in the browser. It also takes care to hide the one which is not used. This "Frame-Swapping" concept may impact test automation, especially when testing several business scenarios in sequence. The actual frame used to display the CRM content may not match the one that has been recorded while creating the test.

The test player 102 solves this issue by using dedicated URI Fragment attributes and by putting the logic to resolve it in the CrmResolver. The URI to target the Input field without knowing the actual frame may uses a crm.area attribute. For instance:

crm.area="WorkArea"; crm.id=header_struct.bp_number"

Note that the two first fragments have been removed and, as a consequence, the CrmResolver is now also responsible for finding the CRMApplicationFrame and the current work area. In this example, the CrmResolver can be aware of this frame hierarchy.

When the whole CRM Application is embedded into an even more complex structure such a Portal page, both URI Fragment syntaxes may be combined like shown below:

```
tag="frame", id="PortalWorkArea" > crm.area ="WorkArea";
crm.Id=header_struct.bp_number
```

The first fragment identifies a frame of the portal page, while the second refers to the CRM application.

Figure 16:
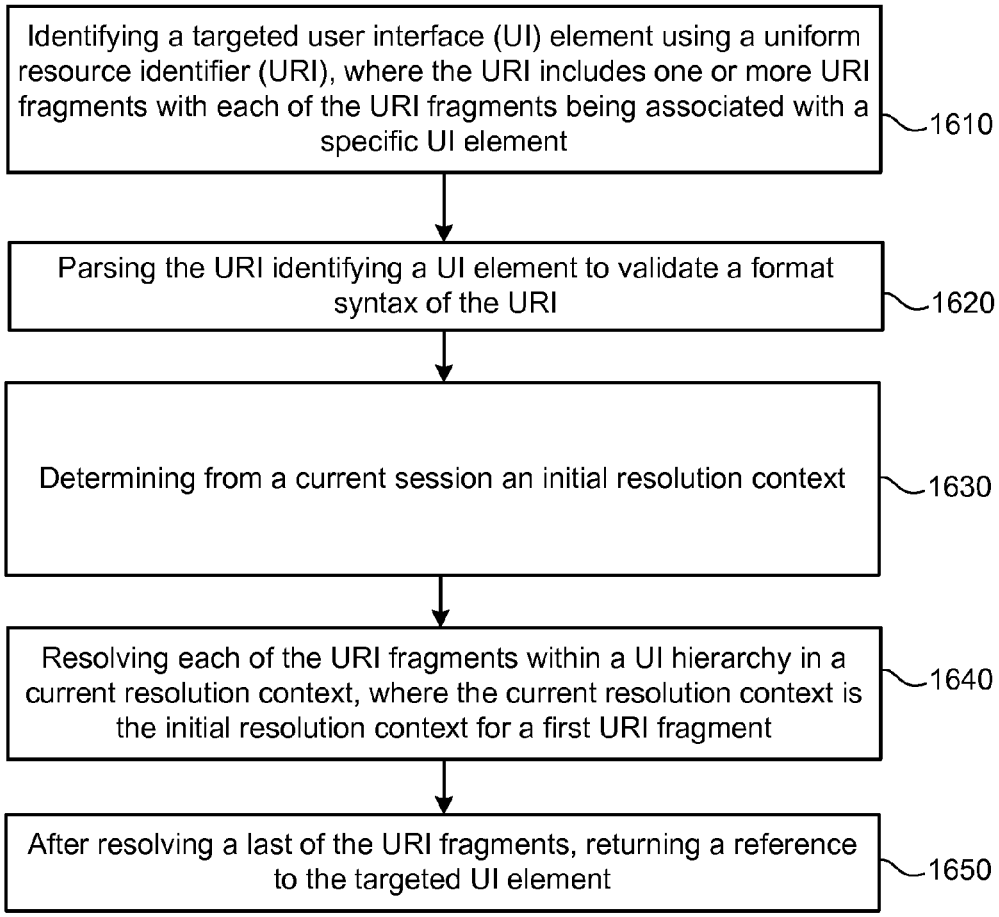
FIG. 16 is an exemplary flow chart of a process illustrating example operations of the system of FIG. 1.

Referring to FIG. 16, an exemplary process 1600 illustrates example operations of the system of FIG. 1. The process 1600 includes identifying a target UI element using a URI, where the URI includes one or more URI fragments with each of the URI fragments being associated with a specific UI element (1610). For example, the test player 102 of FIG. 1 may be configured to identify a target UI element using a URI, where the URI includes one or more URI fragments with each of the URI fragments being associated with a specific UI element (1610).

The process 1600 includes parsing the URI identifying a UI element to validate a format syntax of the URI (1620). For example, the URI parser 104 may be configured to parse the URI identifying a UI element to validate a format syntax of the URI (1620).

The process 1600 includes determining from a current session an initial context resolution (1630), resolving each of the URI fragments within a UI hierarchy in a current resolution context, where the current resolution context is the initial resolution context for a first URI fragment (1640) and after resolving a last of the URI fragments, returning a reference to the targeted UI element (1650). For example, the URI resolver 106 of FIG. 1 may be configured to determine from a current session an initial context resolution (1630), resolve each of the URI fragments within a UI hierarchy in a current resolution context, where the current resolution context is the initial resolution context for a first URI fragment (1640) and after resolving a last of the URI fragments, return a reference to the targeted UI element (1650).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a non-transitory machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method including executing instructions recorded on a non-transitory computer-readable storage media using at least one processor, the method comprising:
   identifying a targeted user interface (UI) element embedded in a sub-application contained within a main application using a uniform resource identifier (URI), wherein the URI includes one or more URI fragments with each of the URI fragments being associated with a specific UI element;
   parsing the URI identifying a UI element to validate a format syntax of the URI;
   determining from a current session an initial resolution context, wherein the initial resolution context includes UI elements in the main application;
   resolving each of the URI fragments within a UI hierarchy in a current resolution context, wherein the current resolution context is the initial resolution context for a first URI fragment in the main application;
   creating a sub resolution context from the initial resolution context for each UI element embedding child elements in the sub-application, wherein the current resolution context includes the sub resolution context for resolving the URI fragments after the first URI fragment;
   delegating resolution of the URI fragments to one or more resolvers within the sub resolution context, wherein each of the resolvers is associated with a specific UI technology; and
   after resolving a last of the URI fragments, returning a reference to the targeted UI element embedded in the sub-application.

2. The method as in claim 1 wherein each of the URI fragments includes a list of attributes.

3. The method as in claim 2 wherein the list of attributes includes attributes covering multiple UI technologies.

4. The method as in claim 2 wherein each of the attributes includes a name and a value.

5. The method as in claim 2 wherein resolving each of the URI fragments includes resolving each of the URI fragments using the list of attributes and the current resolution context.

6. The method as in claim 1 further comprising highlighting the targeted UI element.

7. A non-transitory computer-readable storage medium storing instructions that when executed cause a processor to perform a process, the instructions comprising instructions to:
   identify a targeted user interface (UI) element embedded in a sub-application contained within a main application using a uniform resource identifier (URI), wherein the URI includes one or more URI fragments with each of the URI fragments being associated with a specific UI element;
   parse the URI identifying a UI element to validate a format syntax of the URI;
   determine from a current session an initial resolution context, wherein the initial resolution context includes UI elements in the main application;
   resolve each of the URI fragments within a UI hierarchy in a current resolution context, wherein the current resolution context is the initial resolution context for a first URI fragment;
   create a sub resolution context from the initial resolution context for each UI element embedding child elements in the sub-application, wherein the current resolution context includes the sub resolution context for resolving the URI fragments after the first URI fragment;
   delegate resolution of the URI fragments to one or more resolvers within the sub resolution context, wherein each of the resolvers is associated with a specific UI technology; and
   after resolving a last of the URI fragments, return a reference to the targeted UI element embedded in the sub-application.

8. The non-transitory computer-readable storage medium of claim 7 wherein each of the URI fragments includes a list of attributes.

9. The non-transitory computer-readable storage medium of claim 8 wherein the list of attributes includes attributes covering multiple UI technologies.

10. The non-transitory computer-readable storage medium of claim 8 wherein each of the attributes includes a name and a value.

11. The non-transitory computer-readable storage medium of claim 8 wherein the instructions to resolve each of the URI fragments includes instructions to resolve each of the URI fragments using the list of attributes and the current resolution context.

12. The non-transitory computer-readable storage medium of claim 7 further comprising instructions to highlight the targeted UI element.

13. A computer system, comprising:
   at least one processor;
   a non-transitory computer-readable medium configured to store executable instructions that when executed by the at least one processor are configured to perform a method of:
   identifying a targeted user interface (UI) element embedded in a sub-application contained within a main application using a uniform resource identifier (URI), wherein the URI includes one or more URI fragments with each of the URI fragments being associated with a specific UI element;
   parsing the URI identifying a UI element to validate a format syntax of the URI;
   determining from a current session an initial resolution context, wherein the initial resolution context includes UI elements in the main application;
   resolving each of the URI fragments within a UI hierarchy in a current resolution context, wherein the current resolution context is the initial resolution context for a first URI fragment;
   creating a sub resolution context from the initial resolution context for each UI element embedding child elements in the sub-application, wherein the current resolution context includes the sub resolution context for resolving the URI fragments after the first URI fragment;
   delegating resolution of the URI fragments to one or more resolvers within the sub resolution context, wherein each of the resolvers is associated with a specific UI technology; and
   after resolving a last of the URI fragments, returning a reference to the targeted UI element embedded in the sub-application.

14. The computer system of claim 13 wherein:
   each of the URI fragments includes a list of attributes;
   the list of attributes includes attributes covering multiple UI technologies;
   each of the attributes includes a name and a value; and
   the method implemented by the at least one processor further includes resolving each of the URI fragments using the list of attributes and the current resolution context.

\* \* \* \* \*